Figure 1:
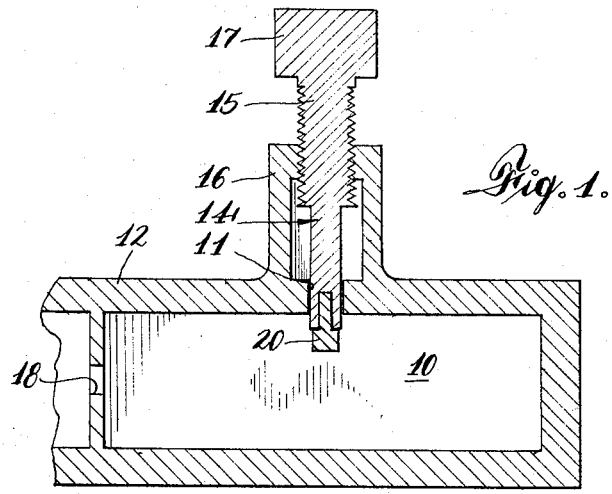

INVENTOR
Uldis Rutulis
BY Weir, Marshall, MacRae & Lamb
PATENT AGENT

United States Patent Office 3,311,839
Patented Mar. 28, 1967

3,311,839
COMPENSATED TUNABLE CAVITY WITH SINGLE VARIABLE ELEMENT
Uldis Rutulis, Ottawa, Ontario, Canada, assignor to Northern Electric Company Limited, Montreal, Quebec, Canada
Filed Dec. 16, 1965, Ser. No. 514,213
4 Claims. (Cl. 330—4.9)

This invention relates to cavity resonators, and in particular it relates to tunable cavity resonators which are compensated for changing quality factor.

Tunable cavity resonators are often required in microwave equipment. There are various known ways of tuning such cavity resonators. For example, one way is to use a reactive tuning rod or post. A conductive rod is inserted at an appropriate place through one of the conductive walls which define the cavity. As the rod is inserted into the cavity, the frequency to which the cavity is resonant will decrease. At the same time, the quality factor of the cavity will tend to increase. This quality factor or Q factor may be referred to simply as Q. In many applications or uses of cavity resonators this change in Q is undesirable. It is known to compensate in some degree for the change in quality factor or Q with frequency by providing a separate control on the cavity resonator capable of introducing loss into the cavity. Thus, when tuning the cavity to resonate at a new frequency, it is necessary to operate two separate controls. It may be inconvenient and perhaps impractical in many instances to have to adjust two independent controls each time the resonant frequency of the cavity resonator is changed.

It is therefore an object of this invention to provide a cavity resonator of novel design which is tunable and which may automatically vary the Q of the cavity in accordance with the tuning.

It is another object of this invention to provide a cavity resonator having a single control which varies the frequency to which the cavity is resonant and which simultaneously varies the Q of the cavity.

Very briefly, the invention comprises a cavity defined by conductive walls and an elongated reactive tuning post mounted on a cavity wall so that it may be inserted into the cavity by a variable amount to change the resonant frequency of the cavity. The post has a portion of a lossy dielectric material arranged to cause a desired increase in the losses of the cavity as the tuning post is inserted into the cavity. The lossy material may be arranged to compensate for the change in Q that would normally be caused by the tuning post, or the lossy material may be arranged to under compensate or over compensate as required.

The invention is particularly suitable for use in a tunable parametric amplifier which includes a varactor diode as the energy storage element and a cavity resonant to the idler frequency $f_i$ of the amplifier. The idler frequency $f_i$, the signal frequency $f_s$, and the pump frequency $f_p$ in such a parametric amplifier are related in the manner indicated in the expression $$f_p = f_i + f_s$$

It is well known in the art that a parametric amplifier may be tuned by varying the idler frequency, the pump frequency being kept constant. It is also well known that the gain of a parametric amplifier is proportional to the strength of the idler frequency signal. If the idler cavity is tuned in order to tune the amplifier, the response of the idler circuit across its tuning range should be constant to provide an amplifier response which is uniform across the entire bandwidth. In some cases, it is desirable to increase the overall bandwidth of the amplifier. One known method of doing this is to add a broadbanding cavity which is coupled to the cavity. However, as the idler and broadbanding cavities are tuned across the band, the bandwidth has been found to decrease with increasing frequency, resulting in a non-uniform amplifier response across the tuning range. It would be possible to utilize two tuning elements in the broadbanding cavity, one to control the tuning and the other to control the Q. By operating the two additional controls as the idler frequency was changed, the overall idler circuit bandwidth could be kept relatively constant and the bandwidth increased. However, the necessity of operating two additional controls in the tuning of an amplifier is undesirable.

It is therefore an object of this invention to provide in a tunable parametric amplifier having a tunable idler frequency cavity, a broadbanding cavity for coupling to the idler cavity and having single tuning means for tuning the broadbanding cavity while compensating for change in idler frequency circuit response.

Figure 2:
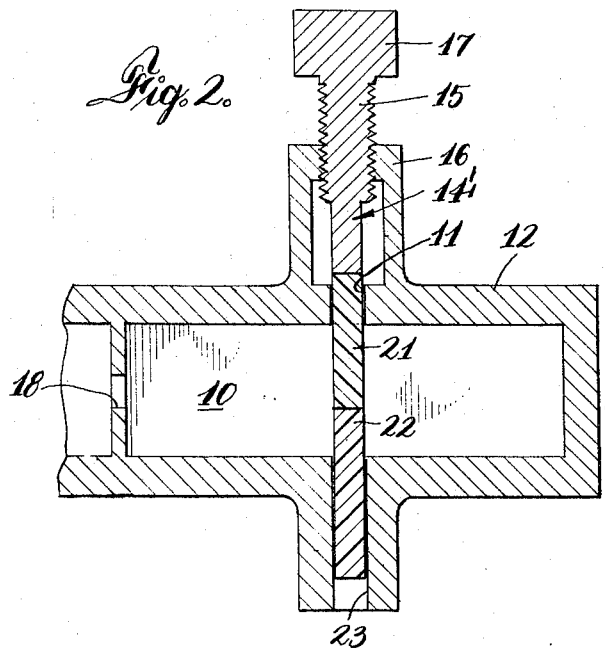
Figure 3A:
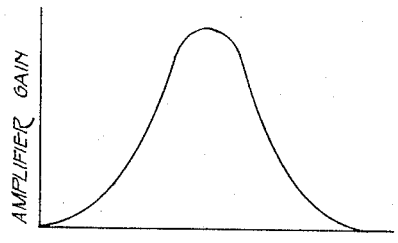
Figure 4:
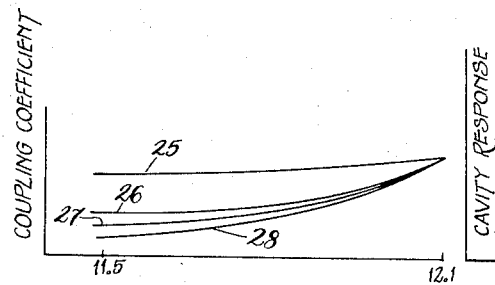
Figure 5:
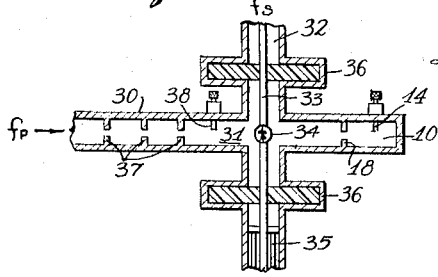

These and other objects and advantages of the invention will become apparent from the following description taken in conjunction with the accompanying drawings, in which FIGURE 1 is a sectional side view of a cavity and tuning element in accordance with an embodiment of the invention, FIGURE 2 is a sectional side view of a cavity and tuning element in accordance with another embodiment of the invention, FIGURES 3a, b, c, d, e, and FIGURE 4 are graphs useful in explaining the invention, and FIGURE 5 is a sectional view of a portion of a parametric amplifier.

Referring now to FIGURE 1, there is shown a resonant cavity 10 having an opening 11 in one of the conductive walls 12 defining the cavity. A metal tuning post 14 has an end portion which fits snugly within opening 11 and may pass therethrough to project into cavity 10. The other end of post 14 has a threaded portion 15 which engages a threaded opening in a cavity wall extension 16 surrounding opening 11. As is known, this arrangement is intended to prevent leakage of microwave energy along the shaft of the tuning post. The tuning post 14 terminates with a control knob 17. Rotation of knob 17 will cause the tuning post 14 to project into cavity 10 by a desired amount. The cavity 10 is provided with a coupling iris 18 for coupling microwave energy to the cavity 10.

The resonant cavity and tuning post as described thus far are known in the art. The tuning post 14 is positioned so that it represents an inductance. As it is inserted farther into the cavity the frequency to which the cavity is resonant will decrease and the unloaded Q of the cavity will increase. In accordance with one embodiment of the present invention as shown in FIGURE 1, the metallic portion of tuning post 14 has inserted in the end a tip 20 of lossy dielectric material. By "lossy material" it is intended to include dielectric materials which would introduce sufficient loss into the cavity to affect the unloaded Q of the cavity. The length of the tip 20 and the dissipation factor of the dielectric material may be determined experimentally to give the required change in the unloaded Q of the cavity with frequency. For example, a tip 20 of nylon having a dielectric constant of 3, a dissipation factor of 0.02, and of a shape substantially as indicated in FIGURE 1, was found adequate to provide the necessary compensation in a cavity having a mid-band frequency of about 11.8 gc./s.

Once all the dielectric material has been inserted into the cavity, further insertion of the tuning post will not increase the losses. In other words, the metallic part of the tuning post has little direct effect on the unloaded Q of the cavity.

It will be apparent that the rate of change of the unloaded Q of a cavity with frequency can be regulated by the size of the dielectric portion, the configuration of the dielectric portion, and the dissipation factor of the dielectric material. The dielectric constant of the dielectric portion will also have some effect because the rate of change of frequency with amount of insertion of the dielectric material will vary depending on the dielectric constant of the material. These several parameters may be varied in numerous ways to meet particular circumstances. FIGURE 2 shows another embodiment of the invention which may be convenient for varying the aforementioned parameters.

Referring now to FIGURE 2, there is shown a tuning post 14' which extends across the resonant cavity 10 and is received in a passage 23 on the opposite side as shown. The tuning post 14' comprises a first portion of metal adjacent the threaded portion 15 as before, a second portion 21 of a low loss dielectric material, and a third portion 22 of a high loss dielectric material. The high loss portion 22 of dielectric material may be referred to as lossy material, and this will increase the losses in the cavity as more and more is inserted. As was previously explained, this tends to decrease the unloaded Q of the cavity. The low loss portion 21, on the other hand, does not increase the cavity losses to any extent, and consequently it permits an increase in the unloaded Q of the cavity as it is inserted. A proper proportioning of the portions of tuning post 14', and a proper selection of the dielectric materials to have an appropriate dissipation factor and an appropriate dielectric constant, can adapt this embodiment to many different circumstances.

Figure 3B:
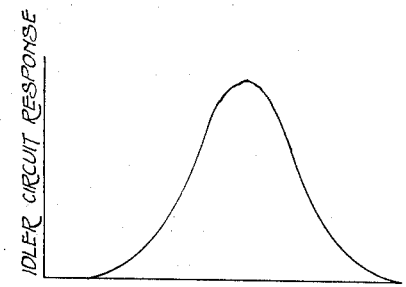
Figure 3C:
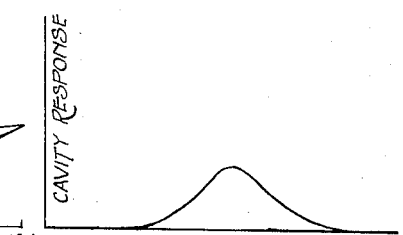
Figure 3E:
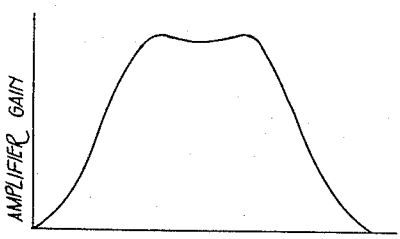
Figure 3D:
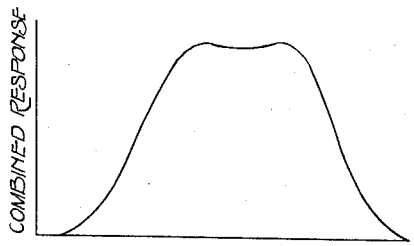

It will be recalled that in a tunable parametric amplifier, tuned by varying the resonant frequency of the idler frequency cavity, the gain characteristic of the amplifier is proportional to the strength of the idler frequency signal. FIGURES 3a and 3b illustrate this. FIGURE 3a is a graph of maplifier gain plotted against signal frefrequency, that is, it illustrates a typical gain characteristic of a known type of tunable parametric amplifier. FIGURE 3b is a typical graph of idler circuit response plotted against idler frequency, for the same amplifier. By coupling a broadbanding cavity to the idler cavity, and by selectively absorbing small amounts of power in the broadbanding cavity, the overall response of the idler circuit may be broadened. Because of the small amounts of power which need be absorbed, the cavity may be undercoupled. FIGURE 3c is a graph indicating a typical response of a broadbanding cavity, and FIGURE 3d, which is a graph showing signal strength vs. idler frequency, indicates the combined response of the idler circuit when the idler cavity and the broadbanding cavity are coupled together. In FIGURE 3e there is shown a graph of amplifier gain vs. signal frequency representative of an amplifier having the combined idler circuit response of FIGURE 3d. Comparsion of FIGURES 3a and 3e indicates that an increased bandwidth can be achieved.

Referring now to FIGURE 5, there is shown a sectional view of a portion of a parametric amplifier having a broadbanding cavity coupled to the idler cavity. A length of waveguide 30 connects a source of pump frequency signal $f_p$ (not shown) to a varactor diode 34 located in an idler frequency cavity 31 which is tuned by tuning post 38. A broadbanding cavity 10 is coupled to idler cavity 31 by coupling iris 18. A coaxial transmission line portion 32 having a center conductor 33 serves to carry the signal frequency $f_s$. The varactor diode 34 or other suitable rectifying device is mounted in the center conductor 33 within the idler cavity 31. A sliding short circuit member 35, which engages the center conductor 33 and adjacent surroundng walls, provides signal tuning. Filters 36 are designed to stop pump frequency and idler frequency signals, while filter 37 is to pass the pump frequency signals.

The broadbanding cavity 10 in FIGURE 5 must have means to tune the cavity as well as means to introduce loss and vary the Q of the cavity. It is desirable that these be combined so that only one additional control is required. This is done by providing a reactive tuning post which has a lossy dielectric material forming at least a portion thereof as has been described previously. This tuning post is indicated as 14 in FIGURE 5 but may be of the type shown in either FIGURE 1 or 2. The tuning post 14 can vary the Q of cavity 10 which affects both cavity 10 and cavity 31 because of the coupling between them. Different dielectric tips 20 (FIGURE 1) will have different effects on the coupling coefficient. The coupling coefficient $\beta$ and the unloaded Q ($Q_0$) of the cavity are related by the expression $$\beta = \frac{Q_0}{Q_L} - 1$$

where $Q_L$ is the loaded Q of the cavity. It will be seen that an increase in the unloaded Q will increase the coupling.

As the amplifier is tuned, the unloaded Q normally changes, and also the loaded Q because of the changing load presented by the varactor diode. The introduction of appropriate loss into the idler cavity as the cavity is tuned, will keep the response uniform.

FIGURE 4 is a graph showing coupling coefficient plotted against frequency for different materials in a tuning post. Curve 25 is for a stainless steel post of 0.125 inch diameter. Curve 26 is for a tuning post of stainless steel having a nylon tip about 0.075 inch long and 0.120 inch in diameter. Curve 27 is for a stainless steel tuning post having a nylon tip about 0.125 inch long and 0.120 inch in diameter. Curve 28 is for a tuning post of nylon 0.120 inch in diameter. It will be seen that the coupling may be controlled to provide an improved response and increase the bandwidth. The amount and shape of dielectric material, the dielectric constant and the appropriate dissipation factor may be determined experimentally.

It is believed that a novel tunable cavity resonator having means for varying the Q with frequency has been described, and also a parametric amplifier using such a cavity.

I claim:
1. A tunable cavity resonator comprising:
  walls defining a hollow resonant cavity,
    one wall only of said cavity being provided with a single opening for receiving a tuning post,
    said opening being located for reactive tuning of the resonant frequency of said cavity,
  an elongated tuning post mounted perpendicularly to said one wall of said cavity at said opening for longitudinal movement through said opening into said cavity,
    said tuning post having a first portion of conducting metal at least part of which extends externally of said cavity, and a second terminating portion of a lossy dielectric material substantially coextensive with said first portion to introduce into said cavity a loss which varies with the amount of insertion of the tuning post.

2. A tunable cavity resonator as defined in claim 1, in which said lossy dielectric material has a dissipation factor of about 0.02 and a dielectric constant of about 3.

3. A tunable microwave cavity resonator comprising fixed walls defining a hollow resonant, cavity,
    a first wall of said cavity being provided with a first opening for receiving a tuning post,
    a second wall of said cavity being provided with a second opening opposite said first opening for receiving said tuning post,
    said first and second openings being located for reactive tuning of said cavity,
  a single means for tuning said cavity resonator consisting of an elongated tuning post mounted perpendicularly to said first wall at said first opening and extending through said first opening across said cavity and into said second opening and means for moving said tuning post longitudinally with respect to said walls, said tuning post having a first portion of conducting metal, at least part of which is located externally of said cavity and part of which extends a variable amount into said cavity, a second portion of low loss dielectric material secured to and substantially coextensive with said first portion, and a third portion of lossy dielectric material secured to and substantially coextensive with said second portion, said third portion having a part thereof in said second opening, said second and third portions providing a predetermined loss in said cavity which varies with the position of said tuning post.

4. A tunable parametric amplifier comprising an idler frequency resonant cavity, means to tune said idler frequency resonant cavity, means for coupling a source of pump frequency signals to said idler frequency cavity, a signal frequency circuit coupled to said idler frequency cavity and including a coaxial transmission line portion having a center conductor extending through said idler frequency cavity, said coaxial transmission line portion terminating in a sliding short circuiting signal frequency tuning element, a rectifying device connected in said center conductor within said idler frequency resonant cavity, a broadbanding cavity defined by fixed conductive walls and coupled to said idler frequency resonant cavity, one wall only of said broadbanding cavity being provided with a single opening for receiving a tuning post, said opening being located for reactive tuning of said cavity, a single means for tuning said broadbanding cavity consisting of an elongated tuning post mounted perpendicularly to said one wall of said cavity at said opening for longitudinal movement through said opening into said cavity and means engaging said tuning post for moving said tuning post longitudinally, said tuning post having a first portion of conducting metal at least part of which extends externally of said broadbanding cavity, and a second end portion of a lossy dielectric material tercoextensive with said first portion to compensate for changes in unloaded Q and coupling of the cavity with changes in the resonant frequency of said idler frequency and broadbanding cavities.

References Cited by the Examiner

UNITED STATES PATENTS

| | | | |
|---|---|---|---|
| 2,761,106 | 8/1956 | Posin | 333—83 |
| 3,087,128 | 4/1963 | Frigyes et al. | 333—83 |
| 3,253,227 | 5/1966 | Uenohara | 330—4.9 |

ROY LAKE, *Primary Examiner.*

DARWIN R. HOSTETTER, *Examiner.*